United States Patent Office 2,763,686
Patented Sept. 18, 1956

2,763,686

PRODUCTION OF OXIMES

Lorraine Guy Donaruma, Woodbury, N. J., assignor to E. I. du Pont de Nemours and Company, Wilmington, Del., a corporation of Delaware No Drawing. Application June 30, 1955,
Serial No. 519,239

7 Claims. (Cl. 260—566)

The present invention relates to a process for the production of amide-forming intermediates and, more particularly, to a process for the production of oximes.

Oximes, particularly cycloaliphatic ketoximes, have long been used as intermediates in the production of amides and cyclic amides (lactams). For example, cyclohexanone oxime, the most important member of this class, has served as an intermediate in the production of caprolactam which generally is produced by the Beckmann rearrangement of cyclohexanone oxime, and many modifications and improvements in this process are known. Heretofore, the commercial production of these amide precursors has generally been by processes wherein ketones or primary or secondary nitro compounds or salts of these nitro compounds are treated with hydroxylamine salts and the like. However, many of these processes are unattractive economically because of the high cost and/or precarious supply of reagents, poor yields, contamination of the desired products, etc. Hence, although many of the prior processes have produced satisfactory amide precursors, the need has long existed for a process whereby the amide precursors could be produced efficiently with the use of relatively inexpensive, readily available materials.

Accordingly, an object of the present invention is to provide an improved process for the production of amide precursors. Another object of the present invention is to provide an efficient process for the production of oximes. A still further object is to provide a process for the conversion of nitro compounds to useful products. Other objects will become apparent as the invention is further described.

I have found that the foregoing objects may be accomplished when I cause a primary or secondary nitro compound to react with aqueous ammonia and carbon disulfide.

In accordance with the process of the present invention, a primary nitro alkane, e. g., nitroethane, a secondary nitro alkane, e. g., 2-nitropropane, or a nitro cycloalkane, e. g., nitrocyclohexane or nitrocyclopentane is caused to react with aqueous ammonia and carbon disulfide at a temperature between about 70 and about 110° C. and under autogenous pressure.

The following examples illustrate specific embodiments of the method of carrying out the process of the present invention. However, the examples will be understood to be illustrative only and not to limit the invention in any way. The parts given in the examples are parts by weight. In each case, the conversion reported is based on the amount of nitro compound charged.

Example 1

A stainless steel bomb was charged with a mixture of 13 parts (0.1 mole) of nitrocyclohexane, 8 parts (0.1 mole) of carbon disulfide, 45 parts (0.7 mole) of 28% aqueous ammonia, and 41 parts of 95% ethanol. The bomb was sealed and agitated at 80–95° C. for approximately seven hours. At the end of this time, the bomb was cooled and vented, and the material in the bomb was poured into 300 parts of water. The pH of the resulting mixture was adjusted to about 6; the mixture then was saturated with sodium chloride, and this treatment was followed by extraction with ether. The ether extract was concentrated and extracted with 20% sulfuric acid. The pH of the acid extract was adjusted to about 6, and the sodium chloride treatment and ether extraction were repeated. The second ether extract was dried, and the ether was removed by distillation to give a residue of 7 parts of cyclohexanone oxime, a conversion of 62%. The unreacted nitrocyclohexane can be recovered by conventional means for recycle, if desired.

Example 2

The procedure of Example 1 was employed in the following runs:

| Run | NCH* | | CS$_2$ | | 28% aq. NH$_3$ | | 95% C$_2$H$_5$OH, parts | Reaction temp. (° C.) | Reaction time (Hrs.) | Cyclohexanone Oxime | |
|---|---|---|---|---|---|---|---|---|---|---|---|
| | parts | moles | parts | moles | parts | moles | | | | parts | percent conversion |
| A | 13 | 0.1 | 16 | 0.2 | 45 | 0.7 | 82 | 80–90 | 3 | 5.6 | 57 |
| B | 13 | 0.1 | 4 | 0.05 | 19 | 0.3 | 41 | 80–95 | 2 | 6 | 53 |
| C | 13 | 0.1 | 8 | 0.1 | 45 | 0.7 | 41 | 80–98 | 1 | 6.3 | 56 |
| D | 13 | 0.1 | 8 | 0.1 | 45 | 0.7 | None | 80–95 | 2 | 5.4 | 48 |
| E | 13 | 0.1 | 16 | 0.2 | 45 | 0.7 | 82 | 70–75 | 2 | 2.5 | 22 |

*NCH = Nitrocyclohexane.

Example 3

The procedure of Example 1 again was followed except that the nitrocyclohexane was replaced by nitrocyclopentane. The reactants, together with 41 parts of 95% ethanol, were introduced into the bomb in the following amounts (parts): nitrocyclopentane, 12 (0.1 mole); carbon disulfide, 8 (0.1 mole); and 28% aqueous ammonia, 45 (0.7 mole). The bomb was sealed and agitated at 80–95° C. for about two hours. Cyclopentanone oxime was obtained in the amount of 5.2 parts (52% conversion).

Example 4

2-nitropropane (9 parts; 0.1 mole) was introduced into the bomb together with same quantities of ethanol, carbon disulfide, and aqueous ammonia as were used in the run of Example 3. The sealed bomb again was agitated at 80–95° C. for about two hours. When the work-up procedure of Example 1 was employed, 3 parts of acetoxime (41% conversion) was recovered.

Example 5

The stainless steel bomb was charged with the following mixture: 15 parts (0.2 mole) of nitroethane, 16 parts (0.2 mole) of carbon disulfide, 54 parts (0.9 mole) of 28% aqueous ammonia, and 33 parts of 95% ethanol, and then was sealed and agitated at 80–95° C. for about two hours. Treatment of the product mixture by the method of Example 1 yielded 2.2 parts (18% conversion) of acetaldoxime.

As may be seen by the foregoing examples, useful oximes are obtained in satisfactory conversions in the process of the present invention when a primary or secondary nitro compound is caused to react with aqueous ammonia and carbon disulfide at a temperature between 70 and about 110° C. and under autogenous pressure. The best conversions to the desired products are obtained when a temperature between about 80 and about 100° C. is employed and, hence, a temperature in this range is to be preferred. The conversions to the desired oximes obtained at temperatures below 70° C. are too low to make the range economically attractive. Temperatures above about 110° C. likewise are unattractive because of excessive decomposition of the oxime products. The unreacted nitro compounds can be recovered by conventional means to be re-used.

The carbon disulfide to nitro compound mole ratio used in the present process may be as low as 0.5 (Run B, Example 2), but the use of larger proportions of the disulfide in the present process is not deleterious to the yield of oximes obtained. The aqueous ammonia should be of a concentration sufficient to provide at least two moles of ammonia and two moles of water, respectively, per mole of nitro compound. However, the use of an excess of ammonia, say between about 3 to 1 and 9 to 1 moles of ammonia per mole of nitro compound, has been shown in the examples to be preferable.

The reactions in the foregoing examples were complete within between about one and seven hours, depending upon the nitro compound used and upon reaction conditions generally. For example, in the case of Run C of Example 2, the reaction was complete in about one hour and in Run A, in about three hours. In both cases, the conversion to the oxime was essentially the same. Hence, the time required for completion of the reaction is not critical in the present process.

The use of a water-soluble solvent is advantageous but not critical in the present process. The examples have illustrated the use of ethanol, but other water-soluble solvents such as other lower alkanols, dioxane, and the like can also be used.

The present invention is not limited to the nitro compounds employed in the runs of the examples. For example, the nitrocyclohexane and nitrocyclopentane used can be replaced by other nitro cycloalkanes and substituted nitro cycloalkanes, such as nitrocycloheptane, nitrocyclooctane, nitromethylcyclohexanes, and the like. Similarly, other primary and secondary nitro alkanes, e. g., 1-nitropropane, or 1- or 2-nitrobutane, can be substituted for the 2-nitropropane and nitroethane employed in the examples.

The foregoing examples additionally illustrate a method of recovering the oximes prepared according to the process of the present invention. For example, following the completion of the reaction, the pH of the product mixture may be adjusted to between about 3 and about 8, any product present in the aqueous phase recovered, e. g., by salting out, and the major portion of the oxime recovered from the organic phase, e. g., by one or more extractions.

The products of the process of the present invention are important amide precursors. For example, the cycloalkanone oximes can be rearranged to lactams, e. g., by the process taught in U. S. Patent 2,487,246, issued November 8, 1949. The acetaldoxime and acetoxime can be rearranged similarly to acetamide and N-methylacetamide, respectively. However, the use of the products of the present invention is not limited to the production of amides. The products are also useful as solvents, intermediates for chemical syntheses, and the like.

The present invention has been described in detail in the foregoing. However, as will be apparent to those skilled in the art, many modifications may be introduced without departure from the scope of the invention. I intend, therefore, to be limited only by the following claims.

I claim:
1. A process for the production of an oxime which comprises reacting aqueous ammonia, carbon disulfide, and a nitro compound of the group consisting of primary nitro alkanes, secondary nitro alkanes, and nitro cycloalkanes, at a temperature between about 70 and about 110° C. and under autogenous pressure, the molar ratio of said carbon disulfide to said nitro compound being at least 0.5, and said aqueous ammonia being of a concentration sufficient to provide a molar ratio of ammonia to said nitro compound of at least 2 and a molar ratio of water to said nitro compound of at least 2.

2. The process as claimed in claim 1, wherein the nitro compound is nitrocyclohexane.

3. The process as claimed in claim 1, wherein the nitro compound is nitrocyclopentane.

4. The process as claimed in claim 1, wherein the nitro compound is 2-nitropropane.

5. The process as claimed in claim 1, wherein said reaction is effected in the presence of a water-soluble organic solvent.

6. A process for the production of an oxime which comprises reacting aqueous ammonia, carbon disulfide, and a nitro compound of the group consisting of primary nitro alkanes, secondary nitro alkanes, and nitro cycloalkanes, at a temperature between about 70 and about 110° C. and under autogenous pressure, the molar ratio of said carbon disulfide to said nitro compound being at least 0.5, and said aqueous ammonia being of a concentration sufficient to provide a molar ratio of ammonia to said nitro compound of at least 2 and a molar ratio of water to said nitro compound of at least 2, adjusting the pH of said reaction mixture to between about 3 and about 8, and thereafter recovering said oxime.

7. The process as claimed in claim 1, wherein said reaction is effected in the presence of ethanol.

No references cited.